United States Patent [19]

Blackwell

[11] Patent Number: 4,620,712

[45] Date of Patent: Nov. 4, 1986

[54] PORTABLE POWER TABLE

[75] Inventor: Scotty Blackwell, Hattiesburg, Miss.

[73] Assignee: Jerrine Wilson, Petal, Miss. ; a part interest

[21] Appl. No.: 663,120

[22] Filed: Oct. 22, 1984

[51] Int. Cl.[4] .................... B62B 1/00

[52] U.S. Cl. .................... 280/47.2

[58] Field of Search .................... 280/47.16, 47.20, 47.12, 280/5.32, 30; 296/20; 414/490, 498; 297/131; 108/12, 18; 144/286 R, 286 A

[56] References Cited

U.S. PATENT DOCUMENTS

| | | | |
|---|---|---|---|
| 2,139,470 | 12/1938 | Schmeiser | 280/53 |
| 2,565,027 | 8/1951 | Jensen | 280/30 |
| 2,662,566 | 12/1953 | Kurschner | 144/286 |
| 3,149,651 | 9/1964 | Belrose | 143/33 |
| 3,598,390 | 8/1971 | Armitage | 280/47.2 |
| 3,669,031 | 6/1972 | Cole | 108/12 |
| 3,857,579 | 12/1974 | Hoodenpyle | 280/47.2 |
| 4,265,283 | 5/1981 | Nash et al. | 144/286 |
| 4,269,096 | 5/1981 | Boone | 144/286 A |
| 4,369,822 | 1/1983 | Rice | 144/286 R |

FOREIGN PATENT DOCUMENTS

| | | | |
|---|---|---|---|
| 2254411 | 7/1975 | France | 144/286 |

*Primary Examiner*—John J. Love
*Assistant Examiner*—Eric D. Culbreth
*Attorney, Agent, or Firm*—Dowell & Dowell

[57] ABSTRACT

Power table equipment has wheels mounted on a lower pair of its legs and a second set of wheels mounted beneath the outer edge of its table and generally above the first set and a lift handle mounted across the other pair of legs so that one person may move the saw to and up onto a raised surface such as the bed of a pickup truck and remove it therefrom.

1 Claim, 8 Drawing Figures

PORTABLE POWER TABLE

BACKGROUND OF THE INVENTION

1. Field of the Invention

The present invention relates to powered equipment having a working table, such as a table saw, and to its adaptation to facilitate horizontal movement and lifting.

2. Description of the Prior Art

Workbenches for power tools and the like have been provided with wheels at one side in order that they may be rolled about a supporting surface. Examples are noted in the U.S. Pat. Nos. to Schmeiser 2,139,470; Kurschner 2,662,566; Belrose 3,149,651; Nash et al. 4,265,283; Boone 4,269,096; Rice 4,369,822; and in the French Pat. No. 2,254,411 of 1975.

Armitage U.S. Pat. No. 3,598,390 discloses an apparatus for preparing wall covering including a frame having wheels so that it may be oriented in a horizontal or an upright position and having two sets of wheels, one set of which is restrainable so that in the upright orientation the apparatus can be displaced in only a side to side direction.

However, the work stand structure of the prior art did not facilitate the lifting of the structure onto a raised platform such as the tailgate of a pickup truck or similar vehicle. Thus, if a workman wished to transport the equipment in a vehicle it was necessary for him to have assistance from a second person.

SUMMARY OF THE INVENTION

Accordingly it is an object of the present invention to provide transport and lifting means for workbench structure such as a powered table saw which will permit one person to move the equipment, without help from anyone else, including moving it into position, lifting it onto the back of a pickup truck, shifting it back to upright position, unloading it from the pickup truck, and moving it to a desired location.

The foregoing objects are accomplished by providing for a powered table saw, having the customary legs and extended table structure, a first set of wheels mounted across a pair of legs on one of the extended sides of the table, a second set of wheels mounted just beneath the edge of the extended side of the table and positioned generally above the first set of wheels, the second set being mounted by bracket means extending between the legs and the table, and a handle mounted across the other pair of legs and just below the base which supports the saw, so that one person may lift the table by the extended top remote from the wheels, or by rails attached thereto, and roll the table into position next to the tailgate of a pickup truck with the second set of wheels overlying the truck's tailgate and then using the lifting handle and the extended top, or rails, tilt the table onto the tailgate and roll it into the truck on the two pair of wheels, following which it may be set in upright position for traveling and then removed from the vehicle at the destination.

DESCRIPTION OF THE PREFERRED EMBODIMENT

Figure 1:
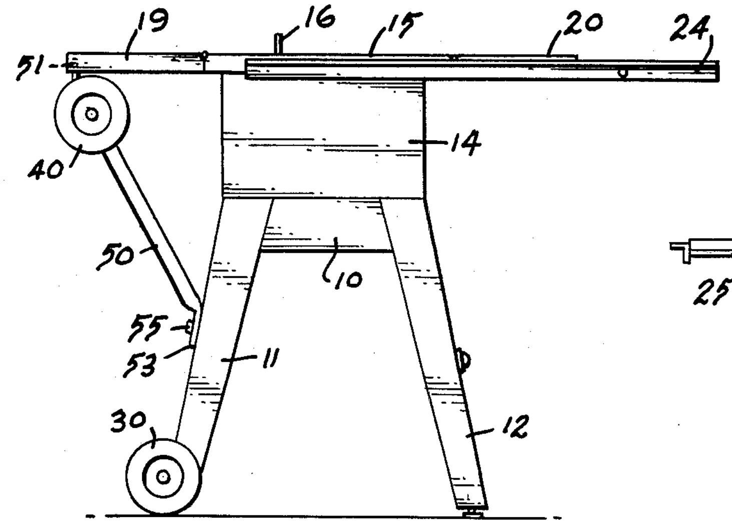
FIG. 1 is a front elevational view illustrating one embodiment of the invention.
Figure 2:
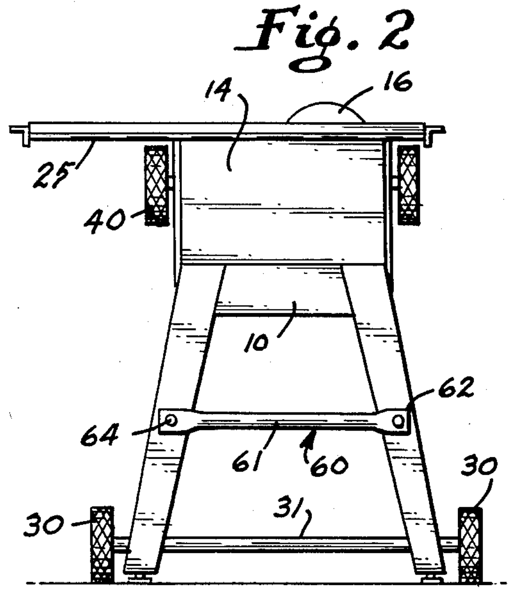
FIG. 2 is a right side elevational view thereof.
Figure 3:
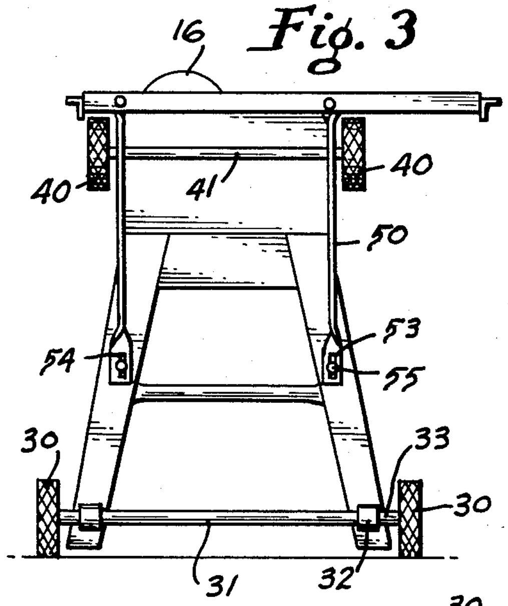
FIG. 3 is a left side elevational view.
Figure 4:
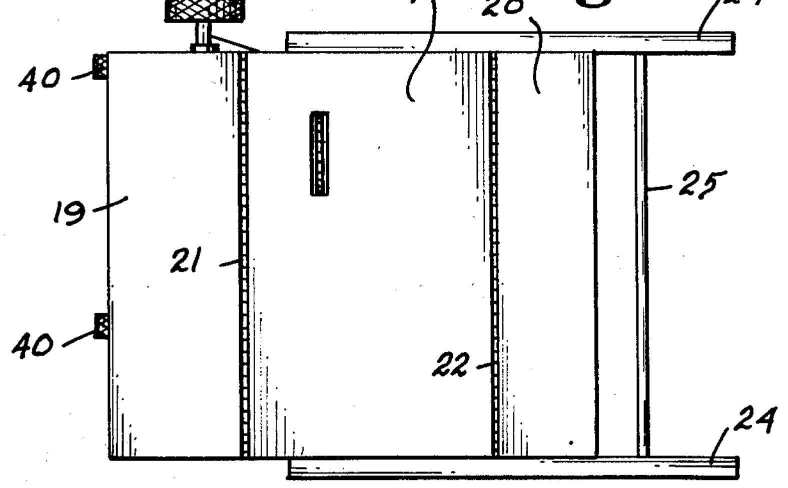
FIG. 4 is a top plan view.

With further reference to the drawings a conventional power table saw is illustrated having a base 10, a pair of front legs 11 and a pair of rear legs 12 which are connected to the base and extend downwardly and outwardly therefrom. The base has mounted thereon a power saw 14 over which a table 15 is mounted. A portion of the blade 16 of the saw extends above the surface of the table in ordinary use.

The table extends outwardly from the saw, ordinarily having first and second extensions 19 and 20 at the front and rear respectively. The extensions may be mounted by hinges 21 and 22 to permit folding for compactness, if desired.

The table commonly is provided with rails 24 on each side, and having a cross rod 25, which may be mounted as indicated in FIG. 1 to project beyond the extension 20.

The power saw 14 is of conventional structure and is ordinarily powered by electricity.

The foregoing structure is representative of that which is known and available in the industry. Due to the weight of the equipment described, the moving of it has ordinarily required two persons, particularly where lifting of it onto a higher platform such as a truck, for transport, is desired.

The present invention provides transport and lifting attachments, and a procedure for lifting the equipment onto a raised platform which can be done by one person. These include a first set of wheels 30 which are rotatably journaled on an axle shaft 31 held by clamps 32 attached to the legs 11. The wheels 30 are journaled on a stub end 33 of the axle and retained by suitable means well known in the art. The axle may be either a shaft or a bar having a stub axle attached thereto, both well known in the art.

A second pair of wheels 40 is mounted just beneath the outer edge of the front extension 19 of the table. The wheels are journaled on a shaft 41 and retained by suitable means well known in the art, the shaft extending through an aperture in a bracket member 50. The member 50 has a first end 51 twisted 90° from the plane of the bracket and angled upwardly at approximately 41°. The other end 53 is also twisted 90° from the plane of the bracket and is angled downwardly at approximately 41°. Slot 54 is provided in each end to receive a bolt 55 that extends through the slot and is secured by a nut. The end 51 is mounted behind the lip of the extended portion 19 of the table. The end 53 is connected to the legs 11, just below the base 10.

In order to permit lifting of the equipment about the wheels 40 a handle 60 is provided which comprises a tube 61 having flattened end portions 62 with apertures for receiving fastening means 64 connected to the rear legs 12, intermediate the base and the bottom of the legs.

Figure 5:
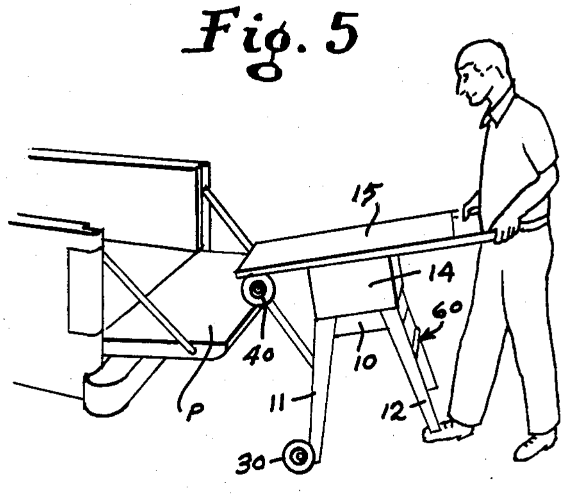
FIGS. 5-8 are perspective views illustrating the steps of loading a table saw into a truck.
Figure 6:
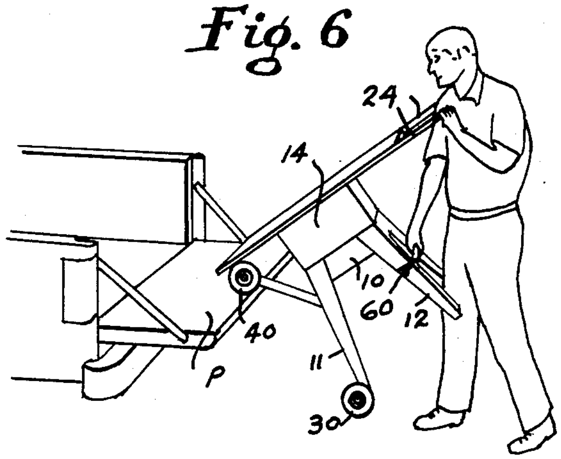
Figure 7:
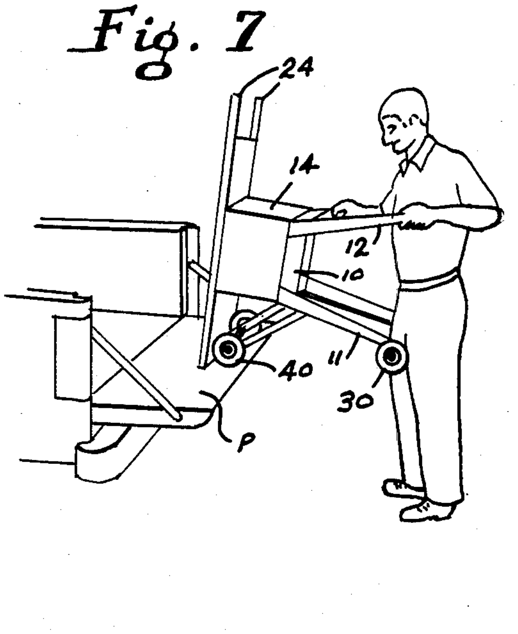
Figure 8:
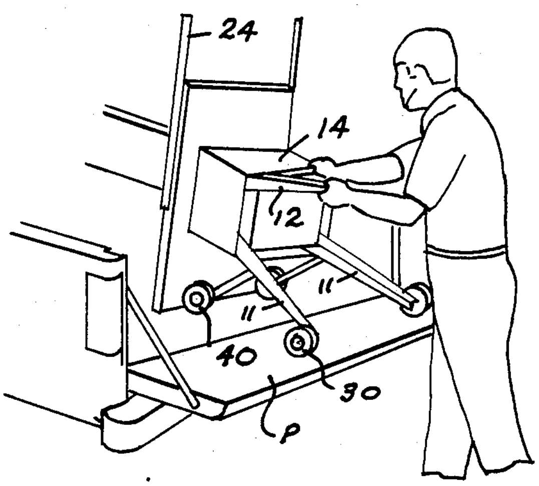

In the use of the attachment when it is desired that it be transported the operator stands behind and between the rails 24 and lifts these in order to move the equipment on the wheels 30 as indicated in FIG. 5. The operator pushes the equipment until the upper set of wheels 40 are above the outer end of the raised platform, such as the tailgate P of a truck, and then lifts the equipment using both the rails 24 and the lifting handle 60 to raise and tilt the equipment simultaneously to a horizontal position onto the tailgate as indicated in FIG. 6. He then pushes it forwardly onto the truck by holding the lifting handle 60 and the lower portion of one or more of the rear legs 12. The operator then climbs into the truck and using the lifting handle and rails 24 lifts the equipment back into vertical position for transport. After arriving at the destination the procedure is reversed for removing the equipment. In the event the table is not equipped with rails 24, the table extension, itself, may be used for lifting. Such extension of the table may be part of a unitary top or a movable element.

I claim:

1. In a power equipment table having a base, first and second sets of leg means extending downwardly and outwardly from the base, power equipment mounted on the base, and table means extending outwardly from the power equipment and providing first and second extension means extending in opposite directions beyond the lateral extent of the base, the improvement comprising, means facilitating movement and loading of the table onto a raised platform, said means including first wheel means mounted at the lower end of the first set of leg means at the side of the table having the first extension means, second wheel means mounted just below said first extension means and outwardly thereof and generally above said first wheel means, said second wheel means being mounted on bracket means having a first end connected to the first extension means and a second end connected to said first set of leg means, and handle means connected to the second set of leg means at the other side of said table from said first and second wheel means and generally below said second extension means and substantially above the lower end of said second set of leg means.

* * * * *